(12) United States Patent
Neudorf

(10) Patent No.: US 8,991,061 B2
(45) Date of Patent: Mar. 31, 2015

(54) TWINE CUTTER FOR A BALE PROCESSOR

(75) Inventor: Blake Neudorf, Vonda (CA)

(73) Assignee: Highline Manufacturing Ltd, Vonda, CA (US)

( * ) Notice: Subject to any disclaimer, the term of this patent is extended or adjusted under 35 U.S.C. 154(b) by 424 days.

(21) Appl. No.: 13/475,524

(22) Filed: May 18, 2012

(65) Prior Publication Data
US 2012/0311875 A1 Dec. 13, 2012

(30) Foreign Application Priority Data
Jun. 9, 2011 (CA) .................................... 2742478

(51) Int. Cl.
B26B 29/06 (2006.01)
A01F 29/00 (2006.01)

(52) U.S. Cl.
CPC .................................. A01F 29/005 (2013.01)
USPC .................... 30/314; 30/340; 83/614; 83/623

(58) Field of Classification Search
CPC ............ B26D 7/006; B26D 5/10; A01F 3/00; A01F 13/00; A01F 29/00; B26B 27/007; B26B 29/00; B26B 29/06
USPC .............. 30/294, 314, 340; 83/643, 614, 623, 83/627
See application file for complete search history.

(56) References Cited

U.S. PATENT DOCUMENTS 6,311,627 B1 * 11/2001 Draper et al. .............. 108/50.11
6,578,784 B1 6/2003 Lischynski et al.
6,711,824 B2 3/2004 Hruska

FOREIGN PATENT DOCUMENTS

CA 2202014 10/1998

* cited by examiner

Primary Examiner — Phong Nguyen
(74) Attorney, Agent, or Firm — Dicke, Billig & Czaja, PLLC

(57) ABSTRACT

A twine cutting apparatus for a bale processor has a guide extending along a length of a floor of the bale chamber, and a knife engaged in the guide and configured such that the knife can slide along the length of the drum and such that a cutting edge of the knife contacts twine wrapped around an outer surface of the drum. A rigid handle is attached at a knife end thereof to the knife and is configured to be gripped by an operator at a grip end thereof outside the bale chamber. A twine access area can be provided on the drum surface to facilitate cutting twine, and the apparatus can be stored inside the bale chamber during operation of the bale processor.

24 Claims, 2 Drawing Sheets

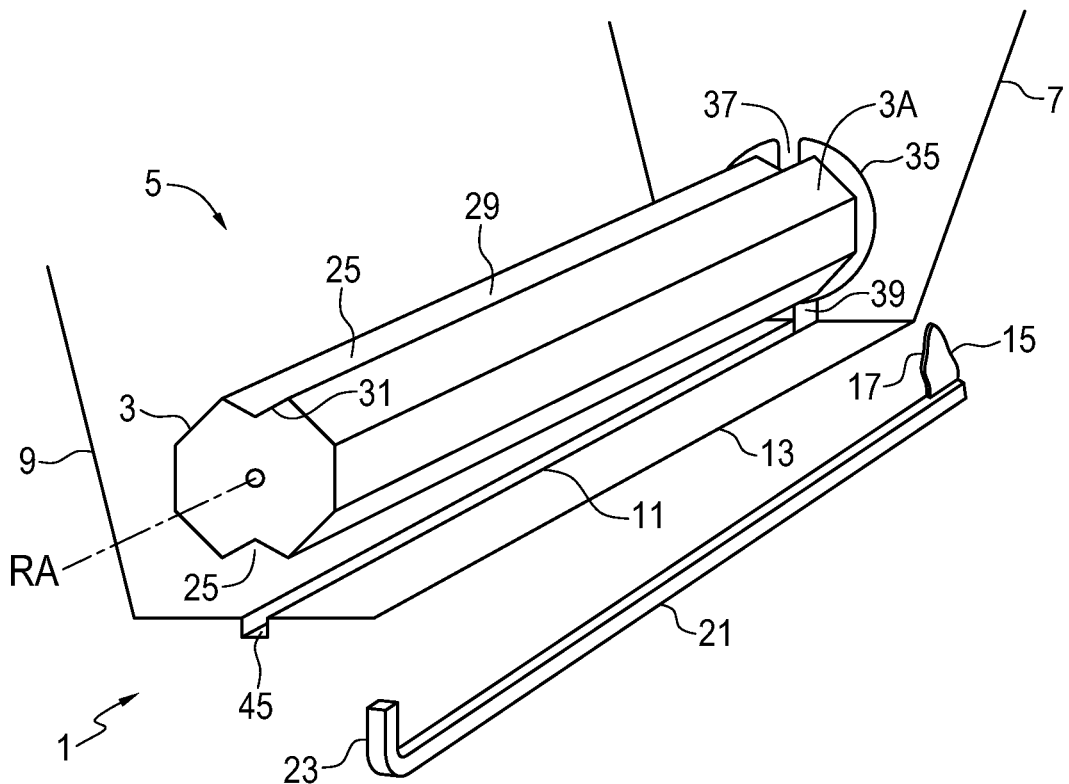
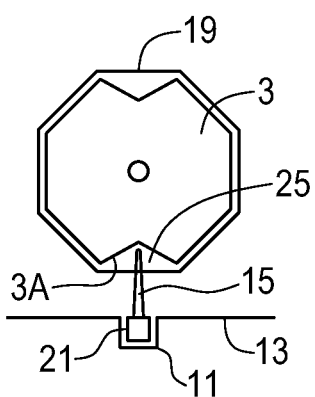
FIG. 1
FIG. 2
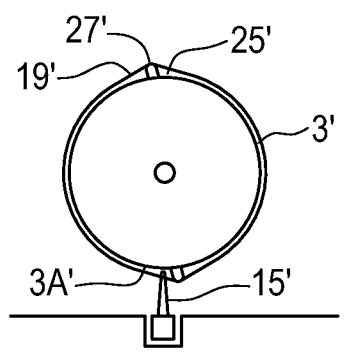
FIG. 3

TWINE CUTTER FOR A BALE PROCESSOR

FIELD OF THE INVENTION

This invention is in the field of agricultural bale processors and in particular a twine cutter to remove twine from the cutting drum of a bale processor.

BACKGROUND

Bale processors are well known where a rotating drum has flails, blades, or like cutting elements extending therefrom to remove material from large bales of crop material. These bales are held together by twine and during operation the twine is cut or broken by the rotor flails. Some of the twine is then pushed out the exhaust opening with the removed crop material, but some also wraps around the drum. This twine wrapped around the drum must be removed periodically, as excessive twine can interfere with the operation of the drum.

Canadian Patent Number 2,202,014 to Kjenner discloses a twine cutter apparatus where a track is provided along a length of the rotating drum, and then a knife is engaged in the track and pulled along the track by a cable to cut the twine.

U.S. Pat. No. 6,578,784 to Lischynski et al. discloses a similar twine cutter but with a rigid handle attached to the knife, the handle extending out of the bale chamber so same may be held and used to move the knife along the track. The drum can be locked to align the track with a hole in the rear wall of the bale chamber and to prevent drum rotation while manipulating the knife.

U.S. Pat. No. 6,711,824 to Hruska discloses another similar twine cutter with a rigid handle where the twine cutter blade has beveled front and rear edges configured to cut in both directions when the handle is moved back and forth.

SUMMARY OF THE INVENTION

It is an object of the present invention to provide a twine cutting apparatus for a bale processor that overcomes problems in the prior art.

In a first embodiment the present invention provides a twine cutting apparatus for a bale processor, where the bale processor includes a cutting drum rotatably mounted in a bale chamber about a rotational axis extending substantially from a front wall to a rear wall of the bale chamber. The apparatus comprises a guide extending along substantially a length of a floor of the bale chamber, and a knife engaged in the guide and configured such that the knife can slide along the length of the drum and such that a cutting edge of the knife contacts twine wrapped around an outer surface of the drum. A substantially rigid handle is attached at a knife end thereof to the knife and is configured to be gripped by an operator at a grip end thereof outside the bale chamber.

In a second embodiment the present invention provides a twine cutting apparatus for a bale processor, where the bale processor includes a cutting drum rotatably mounted in a bale chamber about a rotational axis extending substantially from a front wall to a rear wall of the bale chamber. The apparatus comprises a guide extending along substantially a length of a floor of the bale chamber, and a knife engaged in the guide and configured such that the knife can slide along the length of the drum and such that a cutting edge of the knife contacts twine wrapped around an outer surface of the drum. A substantially rigid handle is attached at a knife end thereof to the knife and is configured to be gripped by an operator at a grip end thereof outside the bale chamber. A twine access area is defined along a length of the drum, the twine access area configured to provide an open area between the outer surface of the drum and twine wrapped around the drum, and a drum lock is operative to lock the drum with respect to the bale chamber in an orientation where the twine access area is aligned with the guide such that when the knife is moved along the guide, an upper end of the knife moves along the twine access area.

The invention provides a convenient twine cutting apparatus that does not require a guide on the drum itself, but where instead the guide is provided on the floor of the bale chamber where balancing of the drum is not affected. Providing the guide in the floor also allows the apparatus to be stored inside the bale chamber where same is ready for use simply by locking the drum and pulling the grip end of the handle that extends from the bale chamber.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic cutaway perspective view of an embodiment of a twine cutting apparatus of the present invention mounted in the bale chamber of a bale processor.

FIG. 2 is a front sectional view of the drum and twine cutting apparatus of FIG. 1 with twine wrapped around the drum.

FIG. 3 is a front sectional view of a drum and twine cutting apparatus with ribs extending from the drum surface to provide a twine access area, and showing twine wrapped around the drum.

FIG. 5 is an end view of the drum showing the end plates with notches to allow the knife to pass through.

DETAILED DESCRIPTION OF THE ILLUSTRATED EMBODIMENTS

Figure 4:
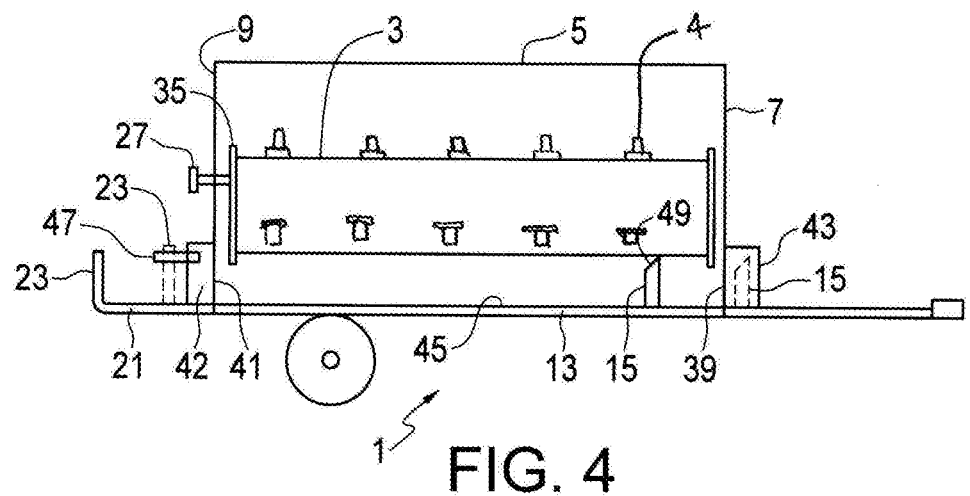
FIG. 4 is a schematic cutaway side view of the bale chamber and twine cutting apparatus of FIG. 1.

FIGS. 1 and 2 schematically illustrate an embodiment of a twine cutting apparatus 1 of the present invention for use in a bale processor. The bale processor includes a cutting drum 3 rotatably mounted in a bale chamber 5 about a rotational axis RA extending substantially from a front wall 7 to a rear wall 9 of the bale chamber 5. Flails 4 or like cutting elements for cutting crop material from a bale, such as are well known in the art, will be attached to the outer surface 3A of the drum 3, as schematically illustrated in FIG. 4.

The apparatus 1 comprises a guide 11 extending along substantially a length of a floor 13 of the bale chamber 5. A knife 15 is shown beside the bale chamber 5 in FIG. 1 and in FIG. 2 is shown engaged in the guide 11. The knife 15 can slide along the length of the drum 3 and such that a cutting edge 17 of the knife 15 contacts twine 19 wrapped around an outer surface of the drum 3. A handle 21 has a knife end attached to the knife 15 and a grip end 23 configured to be gripped by an operator outside the bale chamber 5, as seen in FIG. 4. The grip end 23 of the handle 21 is located outside of the bale chamber 5 adjacent to the rear wall 9 of the bale chamber 5 when the knife 15 is located inside the bale chamber 5 adjacent to the front wall 7 of the bale chamber 5.

The apparatus 1 is shown and described with the grip end 23 of the handle 21 extending out the rear end of the bale chamber 5 because the rear end of a bale processor generally is much more accessible than the front end which typically includes drive lines, gearboxes, the hitch, and the like. If the front end was accessible, the apparatus 1 could be configured with the handle extending from the front wall if so desired.

To facilitate cutting the twine 19 with the knife 15, a twine access area 25 is defined along a length of the drum 3. The twine access area 25 is configured to provide an open area between the outer surface 3A of the drum 3 and twine 19 wrapped around the drum 3, as seen in FIG. 2. A drum lock 27 is operative to lock the drum 3 with respect to the bale chamber 5 in an orientation where the twine access area 25 is aligned with the guide 11 such that when the knife 15 is moved along the guide 11, the upper end of the knife 15 moves along the twine access area 25, as schematically illustrated in FIG. 2.

The twine access area 25 is provided by an indented groove 29 with sloping groove walls 31 along a length of the outer surface 3A of the drum 3. The drum 3 is conveniently balanced by providing a pair of grooves 29 on opposite sides of the drum 3 as illustrated.

Figure 5:
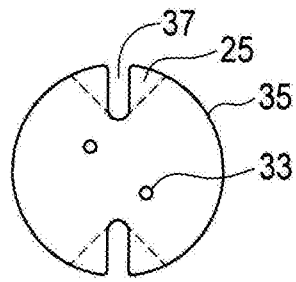

The illustrated drum lock is provided by a lock pin 27 extending through the rear wall 9 and engaging a lock hole 33 in the end plate 35 of the drum 3. Two holes 33 can be provided in the end plate 35, as illustrated in FIG. 5, so that either of the grooves 29 is aligned with the guide 11. The holes 33 will typically be closed at their inner ends to prevent water and other foreign material from entering the interior of the drum 3.

FIG. 3 schematically illustrates an alternate drum 3' where the twine access area 25' is provided by a rib 27' extending from the outer surface 3A' of the drum 3', and where the open twine access area 25' is adjacent to the rib 27'. Twine 19' wrapping around the drum 3' passes over the ribs 27' and an open space for the twine access area 25' is thus provided adjacent to the ribs 27' where the twine 19' slopes down to the outer surface 3A' of the drum 3'. The top end of the knife 15' passes along adjacent to the rib 27'. The drum 3' is balanced by providing a pair of ribs 27' on opposite sides of the drum 3'.

The illustrated drum 3 comprises front and rear end plates 35 and the twine access area 25 extends through notches 37 defined in the front and rear end plates 33, as shown in FIG. 5, such that the knife 15 can be moved through the front and rear end plates 33. A front aperture 39 in the front wall 7 of the bale chamber and a rear aperture 41 in the rear wall 9 of the bale chamber 5 are configured to allow the knife 15 to move through the notches 37 in the front and rear end plates 35, and to thus allow the knife 15 to travel and cut twine along the full length of the drum 3.

In the illustrated apparatus 1, the front aperture 39 is enclosed by a front knife housing 43 extending outward from the front wall 7. The rear aperture 41 is also enclosed by a rear housing 42 extending outward from the rear wall 9 to keep the bale chamber 5 closed.

Conveniently, during operation of the bale processor and rotation of the drum 3, the twine cutting apparatus 1 is moved to a stored position, illustrated by phantom lines in FIG. 4, where the knife 15 is located in the front knife housing 43 and the grip end 23 of the handle 21 is located outside of the bale chamber 3 adjacent to the rear wall 9 of the bale chamber 5. The guide 11 is provided by a track 45 recessed into the floor 13 of the bale chamber 5, and the handle 21 rests inside the track 45 and substantially fills the track 45 when the twine cutting apparatus 1 is in the stored position.

Figure 6:
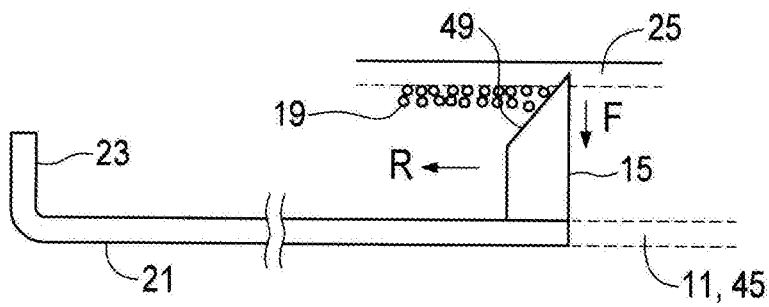
FIG. 6 is a schematic cutaway view showing the knife of the apparatus of FIG. 1 cutting twine by moving in a rearward direction.

The illustrated track 45 and handle 21 have a square cross-section configured such that the handle 21 slidingly engages the track 45 with little room on either side and where a top surface of the handle 21 is substantially even with the surface of the floor 13, as best seen in FIG. 2. The handle 21 thus fills the track 45 during operation so that the track 45 does not fill with crop material and hinder later insertion of the knife into the track 45. A knife lock 47 may be provided to lock the twine cutting apparatus 1 in the stored position, such as by engaging the grip end 23 of the handle, or by other means.

Where the twine cutting apparatus 1 is stored in the position of FIG. 4, with the knife 15 in the front knife housing 43 and the handle 21 filling the track 45, the cutting edge 49 of the knife 15 faces toward the grip end 23 of the handle 21. Thus when it is desired to cut the twine 19 from the drum 3, the drum 3 is rotated by hand to align the lock pin 27 and lock holes 33, the lock pin is inserted to keep the track 45 aligned with the twine access area 25, and the operator grasps the grip end 23 of the handle 21 and pulls the knife 15 rearward in direction R as shown in FIG. 6 such that the cutting edge 49 cuts the twine 19. The top end of the knife travels along the open twine access area 25 so that the cutting edge 49 can engage and cut all the twine 19.

Figure 8:
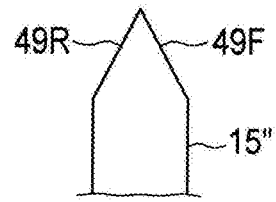
FIG. 8 is a schematic side view of a knife with cutting edges on front and rear sides thereof.

Also as illustrated in FIG. 6, the cutting edge 49 of the knife 15 slopes such that as the sloped cutting edge 15 contacts the twine 19, a downward force F is exerted on the knife 15 towards the guide 11, provided here by track 45, thus keeping the knife engaged in the track 45. It is contemplated that, as schematically illustrated in FIG. 8, the knife 15" could have front and rear cutting edges 49F, 49R so as to cut in both directions.

Figure 7:
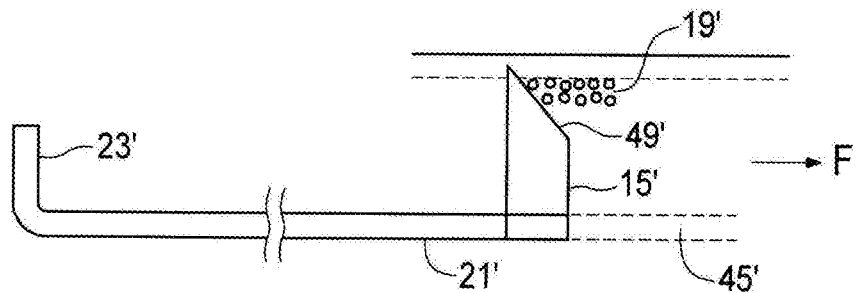
FIG. 7 is a schematic cutaway view showing a knife cutting twine by moving in a forward direction.

Alternatively during operation of the bale processor and rotation of the drum 3, the knife 15 and handle 21 could be removed from the bale chamber 5, and stored in a location on the bale processor or tractor where same is available when needed. When the apparatus 1 is stored outside the bale chamber 5, as illustrated in FIG. 7 the cutting edge 49' of the knife 15' would face away from the grip end 23' of the handle 21'. When it is desired to cut the twine from the drum, the drum is again locked and the operator takes the knife and handle from the stored location, grasps the grip end 23' of the handle 21' and pushes the knife 15' forward in direction F into and along the track 45' as shown in FIG. 7 such that the cutting edge 49' cuts the twine 19' as it moves forward. It may be required to remove crop and like material from the track 45'.

The invention provides a convenient twine cutting apparatus 1 that does not require a guide on the drum 3 itself, but where instead the guide is provided on the floor 13 of the bale chamber 5. The apparatus 1 can be stored in the bale chamber 5 where same is ready for use simply by locking the drum 3 and pulling the grip end 23 of the handle 21 that extends from the bale chamber.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A twine cutting apparatus for a bale processor, where the bale processor includes a cutting drum rotatably mounted in a bale chamber about a rotational axis extending substantially from a front wall to a rear wall of the bale chamber, the apparatus comprising:

a guide extending along substantially a length of a floor of the bale chamber and defined by the floor of the bale chamber;

a knife engaged in the guide and configured such that the knife can slide along the length of the drum and such that a cutting edge of the knife contacts twine wrapped around an outer surface of the drum;

a substantially rigid handle attached at a knife end thereof to the knife and configured to be gripped by an operator at a grip end thereof outside the bale chamber a twine access area defined along a length of the drum, the twine access area configured to provide an open area between the outer surface of the drum and twine wrapped around the drum; and a drum lock operative to lock the drum with respect to the bale chamber in an orientation where the twine access area is aligned with the guide such that when the knife is moved along the guide, an upper end of the knife moves along the twine access area.

2. The apparatus of claim 1 wherein the drum comprises front and rear end plates and wherein the twine access area extends through the front and rear end plates such that the knife can be moved through the front and rear end plates.

3. The apparatus of claim 2 comprising a front aperture in the front wall of the bale chamber and a rear aperture in a rear wall of the bale chamber configured to allow the knife to move through the front and rear end plates, and wherein at least the front aperture is enclosed by a front knife housing extending outward from the front wall.

4. The apparatus of claim 3 wherein during operation of the bale processor and rotation of the drum, the twine cutting apparatus is moved to a stored position where the knife is located in the front knife housing and the grip end of the handle is located outside of the bale chamber adjacent to the rear wall of the bale chamber.

5. The apparatus of claim 4 wherein the guide is provided by a track recessed into the floor of the bale chamber, and wherein the handle rests inside the track when the twine cutting apparatus is in the stored position, and wherein the handle substantially fills the track.

6. A twine cutting apparatus for a bale processor, where the bale processor includes a cutting drum rotatably mounted in a bale chamber about a rotational axis extending substantially from a front wall to a rear wall of the bale chamber, the apparatus comprising:

a guide extending along substantially a length of a floor of the bale chamber and defined by the floor of the bale chamber;

a knife engaged in the guide and configured such that the knife can slide along the length of the drum and such that a cutting edge of the knife contacts twine wrapped around an outer surface of the drum;

a substantially rigid handle attached at a knife end thereof to the knife and configured to be gripped by an operator at a grip end thereof outside the bale chamber;

a twine access area defined along a length of the drum, the twine access area configured to provide an open area between the outer surface of the drum and twine wrapped around the drum; and a drum lock operative to lock the drum with respect to the bale chamber in an orientation where the twine access area is aligned with the guide such that when the knife is moved along the guide, an upper end of the knife moves along the twine access area.

7. The apparatus of claim 6 wherein the twine access area is provided by an indented groove along a length of the outer surface of the drum.

8. The apparatus of claim 7 wherein the groove is provided by sloping groove walls.

9. The apparatus of claim 7 wherein the drum is balanced by providing a pair of grooves on opposite sides of the drum.

10. The apparatus of claim 6 wherein the twine access area is provided by a rib extending from an outer surface of the drum, and wherein the twine access area is adjacent to the rib.

11. The apparatus of claim 10 wherein the drum is balanced by providing a pair of ribs on opposite sides of the drum.

12. The apparatus of claim 6 wherein the drum comprises front and rear end plates and wherein the twine access area extends through the front and rear end plates such that the knife can be moved through the front and rear end plates.

13. The apparatus of claim 12 comprising a front aperture in the front wall of the bale chamber and a rear aperture in a rear wall of the bale chamber configured to allow the knife to move through the front and rear end plates.

14. The apparatus of claim 13 wherein at least the front aperture is enclosed by a front knife housing extending outward from the front wall.

15. The apparatus of claim 14 wherein during operation of the bale processor and rotation of the drum, the twine cutting apparatus is moved to a stored position where the knife is located in the front knife housing and the grip end of the handle is located outside of the bale chamber adjacent to the rear wall of the bale chamber.

16. The apparatus of claim 15 wherein the guide is provided by a track recessed into the floor of the bale chamber, and wherein the handle rests inside the track when the twine cutting apparatus is in the stored position.

17. The apparatus of claim 16 wherein the handle substantially fills the track.

18. The apparatus of claim 15 wherein the cutting edge of the knife faces toward the grip end of the handle.

19. The apparatus of claim 15 comprising a knife lock operative to lock the twine cutting apparatus in the stored position.

20. The apparatus of claim 6 wherein during operation of the bale processor and rotation of the drum, the knife is removed from the bale chamber.

21. The apparatus of claim 20 wherein the cutting edge of the knife faces away from the grip end of the handle.

22. The apparatus of claim 6 wherein the grip end of the handle is located outside of the bale chamber adjacent to the rear wall of the bale chamber when the knife is located inside the bale chamber adjacent to the front wall of the bale chamber.

23. The apparatus of claim 6 wherein the guide is provided by a track recessed into the floor of the bale chamber.

24. The apparatus of claim 6 wherein the cutting edge of the knife slopes such that as the sloped cutting edge contacts the twine, a downward force is exerted on the knife towards the guide.

* * * * *